US012679782B2

(12) United States Patent
Shi

(10) Patent No.: US 12,679,782 B2
(45) Date of Patent: Jul. 14, 2026

(54) COATING LAYER WITH SLOW SIO2 CRYSTALLIZATION RATE

(71) Applicant: Rolls-Royce Corporation, Indianapolis, IN (US)

(72) Inventor: Jun Shi, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/590,844

(22) Filed: Feb. 28, 2024

(65) Prior Publication Data

US 2024/0294440 A1 Sep. 5, 2024

Related U.S. Application Data

(60) Provisional application No. 63/487,986, filed on Mar. 2, 2023.

(51) Int. Cl.
C04B 41/50 (2006.01)
C04B 41/45 (2006.01)
C04B 41/87 (2006.01)

(52) U.S. Cl.
CPC ...... C04B 41/5024 (2013.01); C04B 41/4523 (2013.01); C04B 41/5063 (2013.01); C04B 41/5066 (2013.01); C04B 41/87 (2013.01); C04B 2235/3427 (2013.01); C04B 2235/3865 (2013.01); C04B 2235/3873 (2013.01)

(58) Field of Classification Search
None
See application file for complete search history.

(56) References Cited

U.S. PATENT DOCUMENTS

| | | | |
|---|---|---|---|
| 6,777,093 | B1 | 8/2004 | Ojard et al. |
| 8,940,417 | B2 | 1/2015 | Courcot et al. |
| 10,214,456 | B2 | 2/2019 | Kirby et al. |
| 11,401,217 | B2 | 8/2022 | Kirby et al. |
| 2004/0234740 | A1 | 11/2004 | Ojard et al. |
| 2004/0234784 | A1 | 11/2004 | Eaton et al. |

(Continued)

FOREIGN PATENT DOCUMENTS

| | | |
|---|---|---|
| CN | 107001160 B | 12/2022 |
| EP | 3141631 A1 | 3/2017 |

OTHER PUBLICATIONS

Klemm et al., "Delayed Formation of Thermally Grown Oxide in Environmental Barrier Coatings for Non-Oxide Ceramic Matrix Composites", Coatings, vol. 10, No. 1, MDPI, Dec. 19, 2019, 11 pp.

(Continued)

*Primary Examiner* — David Sample
(74) *Attorney, Agent, or Firm* — Shumaker & Sieffert, P.A.

(57) ABSTRACT

An article having a coating system configured to inhibit or prevent crystallization of a thermally grown oxide (TGO) layer at the operating temperature of the article. An article includes a substrate defining a surface and a coating layer that includes a dopant configured to inhibit crystallization of a thermally grown oxide layer comprising amorphous silicon dioxide at an interface of the coating layer at the operating temperature of the article. The dopant includes an oxide or a nitride. By inhibiting or preventing TGO crystallization, the described coating systems may increase a useable life of the component.

19 Claims, 7 Drawing Sheets

(56)          References Cited

U.S. PATENT DOCUMENTS

| | | |
|---|---|---|
| 2010/0154422 A1 | 6/2010 | Kirby et al. |
| 2016/0265367 A1* | 9/2016 | Rosenzweig ........... C04B 41/52 |
| 2017/0101348 A1* | 4/2017 | Wan ................... C04B 41/5062 |
| 2017/0218779 A1* | 8/2017 | Luthra ................ C04B 41/5035 |
| 2018/0201544 A1 | 7/2018 | Kirby et al. |
| 2022/0024827 A1 | 1/2022 | Golden et al. |
| 2024/0076245 A1 | 3/2024 | Harrington et al. |

OTHER PUBLICATIONS

Lamkin et al., "Oxygen Mobility in Silicon Dioxide and Silicate Glasses: a Review", State of the Art, Journal of the European Ceramic Society 10, Jul. 3, 1991, 21 pp.
Lee et al., "Yb2SiO7 Environmental barrier coatings with reduced bond oxidation rates via chemical modifications for long life", Journal of Amercian Ceramic Society, Jul. 19, 2018, 15 pp.

Richards et al., "Ytterbium Silicate Environmental Barrier Coatings", University of Virginia, May 2015, 322 pp., (Applicant points out, in accordance with MPEP 609.04(a), that the year of publication, 2015, is sufficiently earlier than the effective U.S. filing date, so that the particular month of publication is not an issue.).
Xu et al., "Crystallization and Amorphization of Cristobalite", Journal of Inorganic Materials, vol. 22, No. 4, Jul. 2007, pp. 577-582, (Applicant points out, in accordance with MPEP 609. 04(a), that the year of publication, 2007, is sufficiently earlier than the effective U.S. filing date, so that the particular month of publication is not an issue.) Translation provided for only the Abstract.
Office Action from U.S. Appl. No. 17/929,255 dated Oct. 1, 2025, 8 pp.
Notice of Allowance from U.S. Appl. No. 17/929,255 dated Jan. 28, 2026, 9 pp.
Response to Office Action dated Oct. 1, 2025 from U.S. Appl. No. 17/929,255, filed Jan. 2, 2026, 9 pp.

* cited by examiner

410

416

412

510

516

522

512

COATING LAYER WITH SLOW SIO2 CRYSTALLIZATION RATE

This application claims the benefit of U.S. Provisional Patent Application No. 63/487,986, filed 2 Mar. 2023, the entire contents of which is incorporated herein by reference.

TECHNICAL FIELD

The present disclosure generally relates to coatings for ceramic or ceramic matrix composite materials.

BACKGROUND

Ceramic or ceramic matrix composite (CMC) materials may be useful in a variety of contexts where mechanical and thermal properties are important. Ceramic or CMC materials may be resistant to high temperatures, but some ceramic or CMC materials may react with some elements and compounds present in the operating environment of high temperature mechanical systems, such as water vapor. Reaction with water vapor may result in the recession of the ceramic or CMC material. These reactions may damage the ceramic or CMC material and alter mechanical properties of the ceramic or CMC material, which may reduce the useful lifetime of the component. Thus, in some examples, a ceramic or CMC material may be coated with an environmental barrier coating (EBC), which may reduce exposure of the substrate to elements and/or compounds present in the operating environment of high temperature mechanical systems. In some examples, an intervening bond coat may be present between the EBC and the CMC substrate. The bond coat may be configured to improve the adhesion of the EBC to the CMC.

SUMMARY

The disclosure describes coating systems that include a doped coating layer on a substrate, a doped substrate, or a doped surface layer on a substrate. In examples which include a doped coating layer, the coating layer may be deposited directly on the substrate as a bond coat, deposited on the bond coat as an environmental barrier coating (EBC), or disposed between a bond coat and an EBC as an intermediate layer. The disclosed coating system may inhibit or prevent crystallization of a thermally grown oxide (TGO) layer at the operating temperature of the component. By inhibiting or preventing TGO crystallization, the described coating systems may increase a useable life of the component.

In some examples, the disclosure describes an article that includes a substrate defining a surface and a coating layer. The coating layer includes a dopant configured to inhibit crystallization of amorphous silicon dioxide thermally grown oxide an operating temperature of the article. The dopant includes at least one of an oxide or a nitride. The dopant may include one or more of one or more of silicon nitride, aluminum nitride, lanthanum oxide, boron trioxide, or mixtures or combinations thereof.

In some examples, the disclosure describes a coating system of a gas turbine engine component that includes a coating layer on a ceramic matrix composite (CMC) substrate defining the gas turbine engine component. The CMC substrate includes a silicon-containing material. The coating layer comprises a dopant, and the dopant is configured to inhibit crystallization of amorphous silicon dioxide thermally grown oxide at an interface of the CMC substrate at an operating temperature of the gas turbine engine component.

In some examples, the disclosure describes a method that includes depositing a coating layer formulation doped with a dopant. The dopant is configured to inhibit crystallization of amorphous silicon dioxide thermally grown oxide at an interface of the coating at an operating temperature of an article.

DETAILED DESCRIPTION

Figure 1:
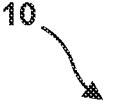
FIG. 1 is a conceptual diagram illustrating a cross-sectional view of an example article that includes a substrate and a coating system that includes a coating layer having a dopant.
Figure 1:
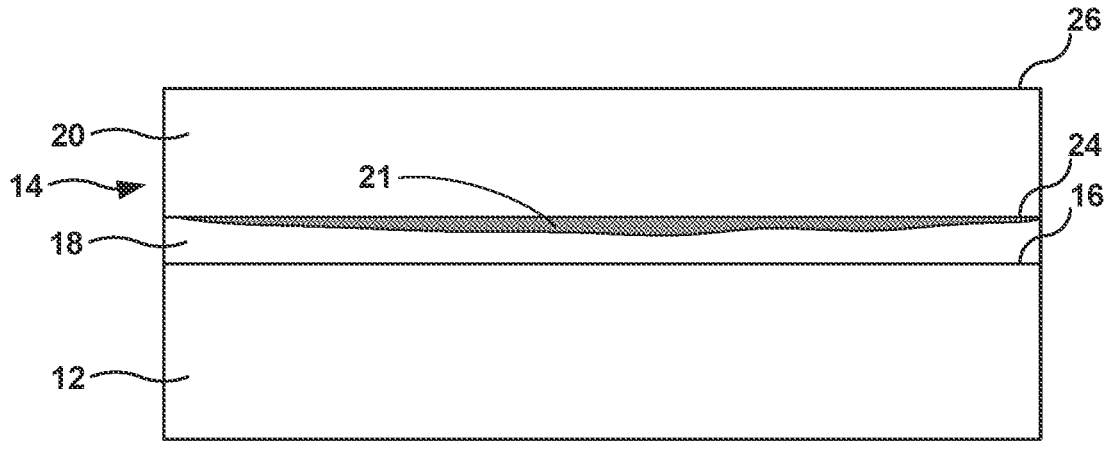
Figure 1:
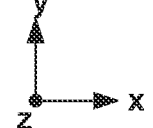

The disclosure generally describes dopants configured to prevent or slow crystallization of a thermally grown oxide layer on a ceramic matrix component. In some examples, the disclosure describes coating systems that include a coating layer having a dopant on or in a silicon containing bond coat. The coating system may be on a substrate, such as a ceramic or ceramic matrix composite (CMC) substrate, defining a component of a high temperature mechanical system, such as a gas turbine engine component. The doped coating layer includes a silicon bond coat on the substrate to improve adhesion of overlaying layers of the coating system, such as an environmental barrier coating (EBC) and/or an abradable coating. Additionally, or alternatively, the dopant may be included within the CMC substrate itself (e.g., a surface layer of the substrate, and some or all of the coating layers may optionally be omitted.

During operation, the component may be exposed to combustion gases. Elements and compounds present in the combustion gases may react with or degrade a portion of the coating system (e.g., a bond coat and/or an EBC of the coating system). For example, during operation, a thermally grown oxide (TGO) layer composed of amorphous silicon dioxide may form on a silicon bond coat from a reaction between silicon in the silicon bond coat and an oxidative species. The TGO may crystallize, for example, after prolonged exposure to high temperatures and repeated thermal cycling events of the CMC component. Crystallized TGO may be more prone to cracking than amorphous TGO. Once cracked, the TGO may break apart, resulting in spallation of the coating system, for example, the EBC or other coating layers overlying the bond coat. Spallation of the EBC may expose the silicon bond coat and/or the CMC substrate to high temperatures, pressures, velocities, and water vapor contained within, for example, the gas path of a gas turbine engine. Under these conditions, the silicon bond coat and/or the CMC may oxidize to form additional silicon dioxide TGO, which may volatilize into silica containing gases (e.g., $Si(OH)_4(g)$) in the presence of water vapor. A recess may form in the surface of the CMC, damaging the component and decreasing the useful life of the component. Thus, a coating system with increased resistance to spallation, as well as an understanding of the possible failure and/or degradation mechanisms that lead to spallation, may improve the life of the coating system and, accordingly, the CMC component.

Without being bound to any particular theory, it is believed that one mechanism for spallation of the EBC may be through degradation of a TGO layer that forms between the EBC and the silicon bond coat. As the TGO forms, it may become a structural element of the coating system (e.g., a coating layer in a coating stack). Therefore, retaining the integrity of the TGO layer may be important for keeping the EBC adhered to the substrate.

Degradation of coating bond strength and or/coating failures have been observed for TGOs exposed under conditions that induce crystallization of the TGO. The failure mechanism may begin with crystallization of the amorphous silicon dioxide TGO into the β-cristobalite phase, which may be accompanied by a volume change (e.g., a contraction). Next, cooling of the coating system below 270° C. may induce transformation of β-cristobalite to the α-cristobalite phase (which is characterized by a volume contraction of approximately 5%), which may induce a strain in the TGO. Stresses/strains may accumulate in the TGO layer since the TGO layer may be constrained by the silicon containing bond coat or substrate, the EBC layer, and residual amorphous TGO in the TGO layer. Cracks (vertical, horizontal, or other) may form in the TGO layer to relieve accumulated stresses/strains. As the component is thermally cycled continually through operation, above and below 270° C., the α/β-cristobalite transition may be repeatedly activated, causing continued formation of cracks. The formation of horizontal cracks may eventually reduce or eliminate the cross-sectional area of the TGO layer that is bonding the EBC to the silicon bond coat or CMC substrate, resulting in coating system failure.

Furthermore, cracking in the TGO layer may reduce hermeticity of the coating system, which may result in growth or accelerated growth of the TGO by permitting oxidative species to migrate into the TGO layer. This may further exacerbate TGO degradation. Ultimately, the outlined failure mechanism may result in partial or complete spallation of the EBC.

The disclosed coating systems may inhibit or prevent crystallization of TGO at the operating temperature of the component, which may reduce, minimize, or eliminate spallation of the coating system. To inhibit or prevent crystallization of TGO, the coating layer includes a dopant configured to migrate into or remain in the TGO layer and stabilize the TGO in an amorphous phase. Inhibiting crystallization of TGO may include at least one of slowing a rate of TGO formation or slowing a rate of TGO crystallization relative to a coating system without a coating layer having a dopant. The coating layer including a dopant may be the bond coat, an intermediate layer between a bond coat and one or more EBC layers, or an EBC layer that overlies the bond coat and/or substrate. The inclusion of a coating layer including a dopant may lead to formation of an amorphous TGO rather than a crystallized TGO, such that at least a portion of the TGO layer may be maintained in an amorphous phase. The amorphous TGO may be less prone to cracking, and thus less prone to coating loss through spallation.

In some examples, the dopant may added to the component substrate, rather than or in addition to being included within the coating system. The dopant may be distributed evenly throughout the substrate or concentrated at a surface layer of the substrate (e.g., only present in a surface layer). Adding the dopant to the substrate may advantageously allow for some or all layers of the coating system to be omitted in some applications.

The dopant may include an oxide or a nitride. As described herein, an oxide is a compound which includes oxygen and at least one other element. As described herein, a nitride is a compound which includes nitrogen and at least one other element. Example oxides may include, but are not limited to, aluminum oxide ($Al_2O_3$), lanthanum oxide ($La_2O_3$), potassium oxide ($K_2O$), sodium aluminate ($Na_2Al_2O4$), calcium oxide (CaO), iron oxide ($Fe_2O_3$), yttrium oxide ($Y_2O_3$), ytterbium oxide ($Yb_2O_3$), combinations thereof, or the like. Example nitrides may include, but are not limited to, silicon nitride ($Si_3N_4$), titanium nitride (TiN), zirconium nitride (ZrN), tantalum nitride (TaN), hafnium nitride (HfN), combinations thereof, or the like.

The dopant may be included in the coating formulation at a level configured to prevent or inhibit crystallization of the TGO without adversely impacting or only minimally impacting other coating properties (e.g., temperature resistance, CTE, etc.). In some examples, the dopant may make up between about 0.1 weight percent (wt. %) and about 15 wt. %, such as between about 0.5 wt. % and about 10 wt. %, or between about 1 wt. % and about 5 wt. % of the coating layer.

In some examples, the dopant may be introduced as a solid solution constituent within a silicate glass into the raw materials (e.g., the coating layer formulation) of the substrate, EBC, and/or bond coat, in any of a powder, a slurry, an ingot, a tape, mixtures or combinations thereof, or the like. The coating layer formulation may be deposited on a substrate to form a coating layer including a dopant through one or more deposition processes, which may include one or more of thermal spray (e.g., atmospheric plasma spray (APS), high velocity oxygen fuel (HVOF) thermal spray, suspension plasma spray (SPS), detonation gun (D-Gun) thermal spray, or the like), slurry spray or paste, tape casting, electrophoretic deposition, physical vapor deposition (PVD), chemical vapor deposition (CVD), plasma spray physical vapor deposition (PS-PVD), electron-beam physical vapor deposition (EB-PVD), or the like. In examples where the coating layer is deposited as a thermal spray, the dopant may be included (e.g., as a blend) with other constituents (e.g., a ceramic feedstock) and fed together with the ceramic feedstock. Additionally, or alternatively, the dopant may fed and/or controlled separately through a dopant feed system, and added to the thermal spray system in the heating zone or downstream of the heating zone. Among other advantages, feeding the dopant separately from the ceramic feedstock may advantageously allow for selecting the fraction of dopant relative to other coating layer constituents in particular regions of the coating layer (e.g., in a region near an interface where a TGO is expected).

Coating systems described herein may be particularly suitable for components of high temperature, thermally cycling systems that are exposed to an oxidizing atmosphere. The operating temperature of the component may include an operating temperature range of a high temperature mechanical component, such as a gas turbine engine component. For example, the operating temperature may include temperatures up to about 3600° F. (1982° C.), up to about 3000° F. (1649° C.), up to about 2700° F. (1482° C.), up to about 2500° F. (1371° C.), or up to about 2400° F. (1316° C.).

Although the disclosure describes coating systems including bond coats and EBCs, in other examples, the subject matter described herein may be applied to coatings of other types, such as abradable coatings, abrasive coatings, thermal barrier coatings, self-lubricating coatings, or the like. The layer structure and compositions may differ for these different types of coatings, but one or more coating layers including a dopant may be used in these other coating systems.

FIG. 1 is a conceptual diagram illustrating a cross-sectional view of an example article 10 that includes a substrate 12 and coating system 14. Article 10 may be a component of a high temperature mechanical system. For example, article 10 may be a blade track, a blade shroud, an airfoil, a blade, a vane, a combustion chamber liner, an engine hot section component, or the like, of a gas turbine engine.

Substrate 12 may include a ceramic or a ceramic matrix composite (CMC). In examples in which substrate 12 includes a ceramic, the ceramic may be substantially homogeneous. In examples in which substrate 12 includes a CMC, substrate 12 may include a matrix material and a reinforcement material. The matrix material may include a ceramic material, such as, for example, SiC, $Si_3N_4$, $Al_2O_3$, aluminosilicates, $SiO_2$, combinations thereof, or the like. The reinforcement material may include discontinuous whiskers, platelets, or particulates; or continuous monofilament or multifilament weave. In some examples, the composition of the reinforcement material is the same as the composition of the matrix material. For example, a matrix material comprising silicon carbide may surround a reinforcement material comprising silicon carbide whiskers. In other examples, the reinforcement material includes a different composition than the composition of the matrix material, such as aluminosilicate fibers in an alumina matrix, or the like. One composition of a substrate 12 that includes a CMC includes a reinforcement material including silicon carbide continuous fibers embedded in a matrix material including silicon carbide. In some examples, substrate 12 may include a SiC—SiC CMC, in which a fibrous preform including SiC fibers is impregnated with SiC particles from a slurry, then melt infiltrated with silicon metal or a silicon alloy to form the melt-infiltrated SiC—SiC CMC.

In some examples, substrate 12 may include a metal alloy, a metal superalloy, a metal alloy that includes silicon. For example, substrate 12 may include a metal alloy that includes Si, such as a molybdenum-silicon alloy (e.g., $MoSi_2$) or a niobium-silicon alloy (e.g., $NbSi_2$).

Coating system 14 may include a bond coat 18 and a coating 20. As shown in FIG. 1, article 10 includes bond coat 18 on substrate 12. As used herein, "formed on" and "on" mean a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent another layer or coating, i.e., there are no intermediate layers or coatings. In some examples, bond coat 18 is directly on a surface 16 defined by substrate 12. Coating 20 may be directly on a surface 24 of bond coat 18.

Bond coat 18 may improve adhesion between substrate 12 and the layer overlying bond coat 18 (e.g., coating 20). Bond coat 18 may include any useful material that improves adhesion between substrate 12 and an overlying layer. In some examples, bond coat 18 may act as a protective layer that decreases migration of an oxidizing agent into substrate 12 by reacting with an oxidizing species to form a protective TGO layer 21. Bond coat 18 may have any suitable thickness. In some examples, a thickness of bond coat 18 may be within a range from about 25.4 micrometers (μm, about 0.001 inch) to about 254 μm (about 0.01 inch). In some examples, article 10 may not include a bond coat 18, and coating 20 may be formed directly on substrate 12.

Coating system 14 (e.g., coating 20) may define an outer surface 26. Coating 20 may include at least one of an environmental barrier coating (EBC). Coating 20 includes one or more layers of material configured to protect substrate 12 during operation of article 10. In some examples, coating 20 also may be configured to reduce or substantially prevent attack of bond coat 18 and/or substrate 12 by chemical species present in the operating environment of article 10, e.g., the operating environment of a high temperature mechanical component. The operating environment of article 10 may include, for example, the intake gas, combustion gas, or exhaust gas of a gas turbine engine. In some examples, coating 20 may include a material that is resistant to oxidation or water vapor attack. Bond coat 18 and/or coating 20 may be formed on substrate 12 using, for example, thermal spray (APS, HVOF, SPS, D-Gun), slurry spray or paste, tape casting, electrophoretic deposition, PVD, CVD, PS-PVD, EB-PVD, or the like.

In some examples, bond coat 18 and/or coating 20 may be formed by thermal spraying. As discussed in FIG. 7 below, thermal spraying may involve spraying powders that contact and deform on a surface of a substrate or coating to form a deposit. A microstructure of a layer, such as bond coat 18 and/or coating 20, formed by thermal spraying may include deposits that include distinct grains or boundaries corresponding to the sprayed particles. For example, bond coat 18 formed by thermal spraying may include deposits of silicon metal and deposits of the dopant. As a result, a microstructure of a thermally sprayed coating may be differentiated from a microstructure of coatings deposited by other methods that do not involve particles that form distinct and deformed deposits. An example thermal spray system is discussed below with respect to FIG. 7.

Article 10 may include at least one component that includes silicon. In examples in which substrate 12 is a ceramic or CMC, bond coat 18 may include a silicon-based bond coat, and may include silicon metal (e.g., elemental silicon; Si), a silicon-containing alloy, a silicon-containing ceramic, or another silicon-containing compound. In some examples, the presence of Si in bond coat 18 may promote adherence between bond coat 18 and substrate 12 and between bond coat 18 and coating 20, such as, for example, when substrate 12, coating 20, or both, includes silicon metal or a silicon-containing alloy or compound. In some examples, substrate 12 may include a silicon-containing ceramic or CMC having a silicon-containing ceramic, such $SiO_2$, silicon carbide (SiC), or silicon nitride ($Si_3N_4$); aluminum oxide ($Al_2O_3$); aluminosilicates (e.g., $Al_2SiO_5$); combinations thereof; or the like.

During operation, Si in substrate 12 and/or bond coat 18 may react with an oxidizing species to form an amorphous silicon dioxide thermally grown oxide (TGO) layer 21 on or near surfaces 16 and/or 24 (i.e., one or more of the interfaces of bond coat layer 18). For example, TGO layer 21 may form on surface 16 of substrate 12 and/or surface 24 of bond coat 18, as illustrated in FIG. 1. The amorphous silicon dioxide of TGO layer 21 may be relatively dense, such that TGO layer 21 may function as a protective barrier against oxidizing species. As discussed above, under thermal cycling, the amorphous silicon oxide of TGO layer 21 may crystallize and subsequently crack due to the β to α-cristobalite transformation, which may, in some examples, result in spallation of at least a portion of coating system 14, such as coating 20.

To inhibit crystallization of amorphous silicon dioxide in TGO layer 21, coating system 14 includes at least one dopant. The dopant may include one or more elements configured to migrate from bond coat 18 and/or coating 20 into TGO layer 21 and inhibit formation of a crystalline phase of silica from an amorphous phase of silica in at least a portion of TGO layer 21. Without wishing to be bound by any theory, a dopant which includes an oxide or a nitride may, in some examples, change a glass transition temperature ($T_g$) of TGO layer 21. TGO layer 21 having a different (e.g. higher) $T_g$ may have a different viscosity at a particular temperature and different kinetics of crystallization. Accordingly, the crystallization regime of TGO layer 21 may be different due to the dopant. For example, a dopant present in coating 20 may migrate from coating 20 into TGO layer 21 and stabilize an amorphous phase of a portion of TGO layer 21 near surface 24. This amorphous phase may be substantially continuous, thereby forming a hermetic barrier between coating 20 and bond coat 18 regardless of formation of a crystalline phase in another portion of TGO layer 21. As a result, the amorphous phase may reduce further migration of oxidizing species into bond coat 18 to further grow TGO layer 21. TGO layer 21 including both an amorphous phase portion and a crystalline phase portion may be desirable in some examples. Alternatively, in some examples, TGO layer 21 may include only an amorphous phase portion.

In some examples, bond coat 18 may include a dopant configured to inhibit crystallization of amorphous silicon dioxide thermally grown oxide (TGO) on surface 24 of bond coat 18 at an operating temperature of article 10. Although described herein as included within bond coat 18, the dopant may in some examples be included in coating 20, or in both bond coat 18 and coating 20. In some examples, the doped coating layer may be a portion of bond coat 18. For example, the doped coating layer may be a first region of bond coat 18 at or near surface 24. In this example, a second region of bond coat 18 nearer surface 16 may include less dopant than the first region of bond coat 18. In this way, bond coat 18 may be configured to form a bilayer TGO layer 21 in operation.

In some examples, at least one layer of coating 20 may include a dopant configured to inhibit crystallization of amorphous silicon dioxide thermally grown oxide on the surface at an operating temperature of the article. The doped layer of coating 20 may be configured to inhibit or prevent crystallization of TGO layer 21 at the operating temperature of article 10.

The doped coating layer of coating system 14 (e.g., bond layer 18, coating 20, or both) may include an oxide, a nitride, or both. In some examples, the dopant or dopants may be selected to be substantially unreactive with RE silicates and/or $SiO_2$. In some examples, substantially unreactive may include, e.g., chemical reactions or interactions that do not compromise and/or alter the mechanical properties or the chemical properties of coating system 14. For example, the dopant may react with components of coating system 14 in a way that results in reaction products that do not interfere with coating performance or occur at such slow rate that the performance of coating system reaches the end of its useful life before the reaction between the dopant and coating system 14 becomes problematic, which may be considered substantially unreactive with coating system 14.

In some examples, an amount of dopant in the doped coating layer of coating system 14 may be within a range from about 0.1 wt. % to about 15 wt. %, such as from about 0.5 wt. % to about 10 wt. % or about 1 wt. % to about 5 wt. %. In some examples, the amount of dopant added to the doped coating layer of coating system 14 may be selected or tailored based on one or more of an anticipated operating temperature, an anticipated oxidizing species encountered, or the like. In some examples, an anticipated oxidizing species encountered may be based partially or totally on a location in a gas turbine engine where coating system 14 is applied, or on a geography the gas turbine engine will operate in, combinations thereof, or the like. Addition of too little dopant into the doped coating layer of coating system 14 may not keep the TGO amorphous. On the other hand, addition of too much dopant into the doped coating layer of coating system 14 may cause deleterious effects, such as causing the TGO to become too soft, increasing oxidation rates by modifying the transport of oxidant species throughout the TGO, or other problems.

In some examples, the doped coating layer of coating system 14 may include more than one (e.g., at least two, or at least three) oxide or nitride. Inclusion of more than compound in the dopant may inhibit crystallization of TGO layer 21 more effectively than a dopant including only a single compound.

In some examples, the dopant may include one or more oxides or nitrides and one or more optional second dopants. The one or more optional second dopants may be sintering aids configured to densify (e.g., reduce porosity) coating 20 and/or provide a more hermetic coating compared to coating 20 without the one or more optional second dopants. In this way, the one or more optional second dopants may reduce migration of elements or compounds (e.g., oxygen or water vapor) into coating 20.

In examples in which the doped coating layer of coating system 14 includes an EBC, coating 20 may include, in addition to the glass modifier and optional second dopant, an EBC material. The EBC material may include, for example, at least one of mullite; a glass ceramic such as barium strontium aluminosilicate ($BaO$—$SrO$—$Al_2O_3$-$2SiO_2$; BSAS), calcium aluminosilicate ($CaAl_2Si_2O_8$; CAS), cordierite (magnesium aluminosilicate), and lithium aluminosilicate; or one or more rare-earth silicates (silicates of Lu, Yb, Tm, Er, Ho, Dy, Tb, Gd, Eu, Sm, Pm, Nd, Pr, Ce, La, Y, or Sc). The rare-earth silicate may be a rare-earth mono-silicate (e.g., $RE_2SiO_5$) and/or a rare-earth disilicate (e.g., $RE_2Si_2O_7$). In some examples, the rare-earth silicate may include two or more rare-earth metals. For example, the doped coating layer of coating 20 includes an EBC may include $(Yb_{0.5}Y_{0.5})_2$—$SiO_5$ and/or $(Yb_{0.5}Y_{0.5})_2$—$Si_2O_7$).

In some examples, the EBC of coating 20 may include an additive in addition to the primary constituents of the EBC. For example, the additive may include at least one of $TiO_2$, $HfSiO_4$, an alkali metal oxide, or an alkali earth metal oxide. The additive may be added to the EBC to modify one or more desired properties of the EBC. For example, the additive components may increase or decrease the reaction rate of the EBC with CMAS, may modify the viscosity of the reaction product from the reaction of CMAS and the EBC, may increase adhesion of the EBC to bond coat 18, may increase or decrease the chemical stability of the EBC, or the like.

In some examples, the EBC of coating 20 may have a coefficient of thermal expansion (CTE) that is close to substrate 12 and/or bond coat 18. For example, in examples where the EBC includes ytterbium disilicate ($Yb_2Si_2O_7$), bond coat 18 includes silicon (Si) metal, and substrate 12 includes silicon carbide (SiC), ytterbium disilicate may have a CTE of about $4.7 \times 10^{-6\circ}$ $C.^{-1}$, while silicon and silicon carbide may each have a CTE of about $4.5 \times 10^{-6\circ}$ $C.^{-1}$.

In some examples, the dopant may be selected or tuned according to the chemistry of the EBC of coating 20. For example, in examples where the EBC of coating 20 includes a rare-earth disilicate such as $RE_2Si_2O_7$, the dopant may include $Yb_2O_3$. In examples, where the EBC includes a dual cation rare-earth disilicate such as $(Yb_{0.5}Y_{0.5})_2$—$Si_2O_7$), the dopant may include $Yb_2O_3$ and/or $Y_2O_3$. Selecting the dopant based on the chemistry of the EBC of coating 20 may improve the CMAS resistance of the coating and/or may minimize the occurrence of undesired interactions between the EBC of coating 20 and the dopant.

Regardless of the composition of coating 20, in some examples, coating 20 may have a dense microstructure, a porous microstructure, a columnar microstructure, a dense vertically cracked (DVC) structure, or a combination of at least two of dense, porous, or columnar microstructures. A dense microstructure may be more effective in preventing the infiltration of CMAS and other environmental contaminants, while a porous, DVC, or columnar microstructure may be more strain tolerant during thermal cycling. In some examples, coating 20 with a dense microstructure may have a porosity of less than about 10 vol. %, such as less than about 8 vol. %, less than about 5 vol. %, or less than about 2 vol. %, where porosity is measured as a percentage of pore volume divided by total volume of coating 20. In some examples, coating 20 with a porous microstructure may have a porosity of more than about 10 vol. %, such as more than about 15 vol. %, more than 20 vol. %, or more than about 30 vol. %, where porosity is measured as a percentage of pore volume divided by total volume of coating 20.

In some examples, coating 20 may be formed as a substantially non-porous layer. In other examples, coating 20 is formed as a layer that includes a plurality of cracks or pores. In some examples, coating 20 may define a thickness, measured in a direction substantially normal to surface 16 of substrate 12 within a range from about 25.4 μm (about 0.001 inch) to about 508 μm (about 0.02 inch).

In some examples, coating system 14 may include a plurality of layers, such as two or more of an EBC, an abradable coating, an abrasive coating, a thermal barrier coating (TBC), a self-lubricating coating, or other materials used for coating high temperature mechanical system components. At least one of the layers may be include the doped coating layer configured to inhibit crystallization of amorphous silicon dioxide thermally grown oxide on the surface at an operating temperature of the article.

Figure 2:
FIG. 2 is a conceptual diagram illustrating a cross-sectional view of an example article that includes a substrate and a coating system having a plurality of layers, at least one of which includes a dopant.
Figure 2:
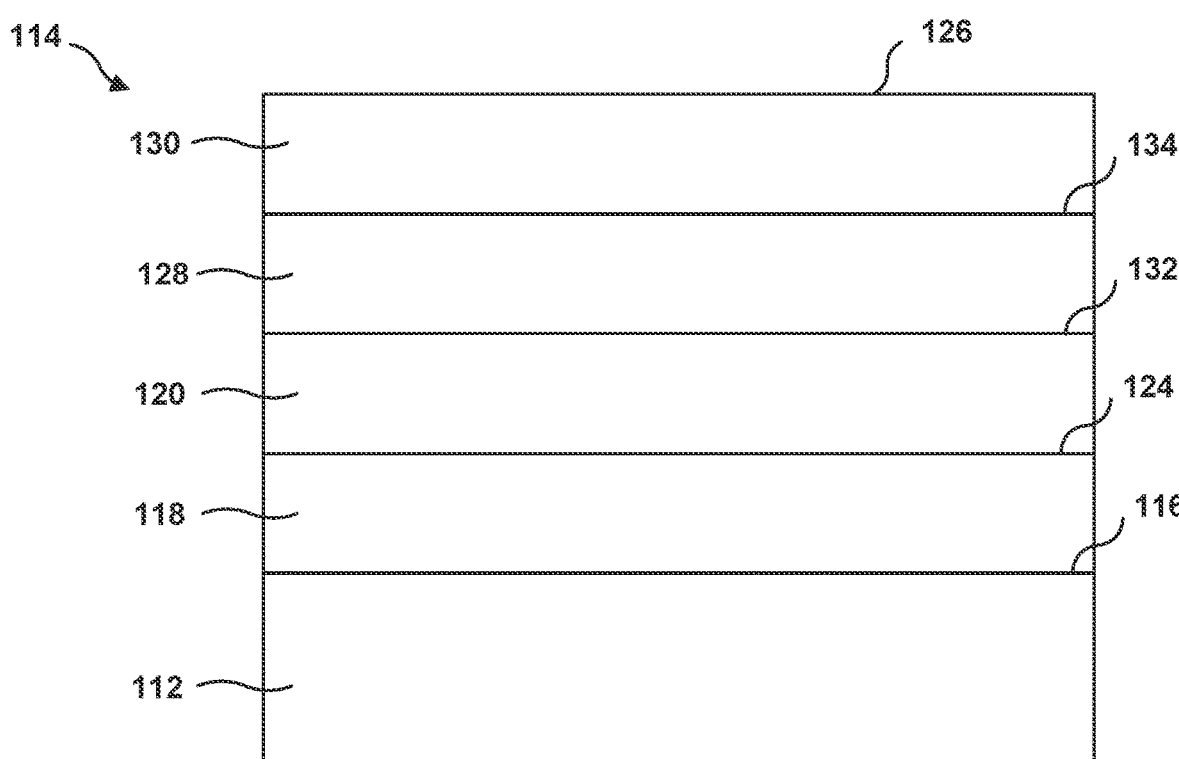
Figure 2:
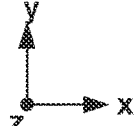

FIG. 2 is a conceptual cross-sectional diagram illustrating an example article 110 that includes coating system 114 having a plurality of layers. Article 110 may be the same as or substantially similar to article 10 described above in reference to FIG. 1, except for the differences described herein. For example, article 110 that includes a substrate 112, a bond coat 118 on a surface 116 of substrate 112, first coating layer 120 on a surface 124 of bond coat 118, a second coating layer 128 on surface 132 of first coating layer 120, and a third coating layer 130 on surface 134 of second coating layer 128. In the example illustrated in FIG. 2, first coating layer 120 includes a doped coating layer, for example, as described above in reference to FIG. 1. Although illustrated as having bond coat 118 and coating layers 120, 128, and 130, in other examples, coating system 114 may have fewer layers, e.g., bond coat 118 and coating layers 120 and 128, or additional layers, e.g., one or more additional coating layers overlying third coating layer 130.

Article 110 may include a bond coat 118 on substrate 112. In some examples, article 110 does not include bond coat 118. For example, first coating layer 120 may be formed directly on substrate 112. Article 110 may not include bond coat 118 when the layer on substrate 112 (e.g., first coating layer 120) and substrate 112 are sufficiently chemically and/or mechanically compatible. For example, in examples where first coating layer 120 and substrate 112 adhere sufficiently strongly to each other, article 110 may not include bond coat 118. Additionally, in examples where the coefficients of thermal expansion of substrate 112 and first coating layer 120 are sufficiently similar, article 110 may not include bond coat 118. First coating layer 120 may be the same as or substantially similar to coating 20 described above in reference to FIG. 1. For example, first coating layer 120 may include the doped coating layer, as described above in reference to FIG. 1.

Second coating layer 128 is on surface 132 of first coating layer 120. Second coating layer 128 may be similar to or substantially the same (e.g., the same or nearly the same) as coating 20 described in reference to FIG. 1 or, in some examples, first coating layer 120. In some examples, second coating layer 128 may include an EBC (without a dopant), an abradable coating, an abrasive coating, a thermal barrier coating, a self-lubricating coating, or other materials used for coating high temperature mechanical system components.

In examples in which second coating layer 128 includes an EBC, second coating layer may include one or more of the EBC materials described above in reference to FIG. 1, a mixture of stoichiometric $RE_2SiO_5$:$RE_2Si_2O_7$, or a $SiO_2$-lean RE monosilicate and/or disilicate (e.g., a composition having less $SiO2$ than $RE_2SiO_5$ and/or $RE_2Si_2O_7$. In some examples, a $SiO_2$-lean RE monosilicate or disilicate may include between about 33.4 to 99.9 mol. % of RE oxide (e.g., $RE_2O_3$) and balance mol. % $SiO_2$.

In examples in which second coating layer 128 includes an abradable coating, the abradable coating may be configured to protect article 110, e.g., coating system 114, from physical damage, such as abrasion or impact against other components or debris. An abradable coating may be configured to be abraded, e.g., by a blade of a gas turbine engine, in order to form a relatively tight seal between article 110 and another component, such as, for example, a blade of a gas turbine engine. In some examples, abradability may include a disposition to break into relatively small pieces when exposed to a sufficient physical force. Abradability may be influenced by the material characteristics of the material(s) in the abradable coating, such as fracture toughness and fracture mechanism (e.g., brittle fracture), as well as the porosity of the abradable coating. In some examples, the abradable costing may exhibit thermal shock resistance and high-temperature capability.

The abradable coating may include any suitable material. For example, the abradable coating may include at least one of a rare-earth oxide, a rare-earth silicate, an aluminosilicate, or an alkaline earth aluminosilicate. In some examples, the abradable coating may include at least one rare-earth disilicate, mullite, BSAS, BAS, SAS, at least one rare-earth oxide, at least one rare-earth monosilicate, or combinations thereof. Additionally, or alternatively, the abradable coating may include any of the compositions described herein with respect to the EBC.

In examples in which second coating layer 128 includes a TBC, the TBC may have a low thermal conductivity (i.e., both/either an intrinsic thermal conductivity of the material(s) that forms the TBC and/or an effective thermal conductivity of the TBC as constructed) to provide thermal insulation to substrate 112, bond coat 118, and/or layers of coating system 114. Heat is transferred through the TBC through conduction and radiation. The inclusion of rare-earth oxides such as ytterbia, samaria, lutetia, scandia, ceria, gadolinia, neodynia, europia, yttria-stabilized zirconia (YSZ), zirconia stabilized by a single or multiple rare-earth oxides, hafnia stabilized by a single or multiple rare-earth oxides, zirconia-rare-earth oxide compounds, such as $RE_2Zr_2O_7$ (where RE is a rare-earth element), hafnia-rare-earth oxide compounds, such as $RE_2Hf_2O_7$ (where RE is a rare-earth element), and the like as dopants may help decrease the thermal conductivity (by conduction) of the TBC.

In some examples, a doped coating layer may include a graded chemistry (in examples where the doped coating layer is a bond coat or an EBC) and/or graded porosity (in examples where the doped coating layer is an EBC). For example, a graded doped coating layer may include a horizontally graded coating layer having a dopant or a vertically graded coating layer having a dopant. In some examples, the grading may include a graded constituent of the coating layer. For example, a horizontal graded coating layer may include higher RE disilicate volume percent relative to a volume percent of RE monosilicate at or near a bond coat, with increasing amounts of RE monosilicate moving away from surface 116 toward surface 126.

Figure 3:
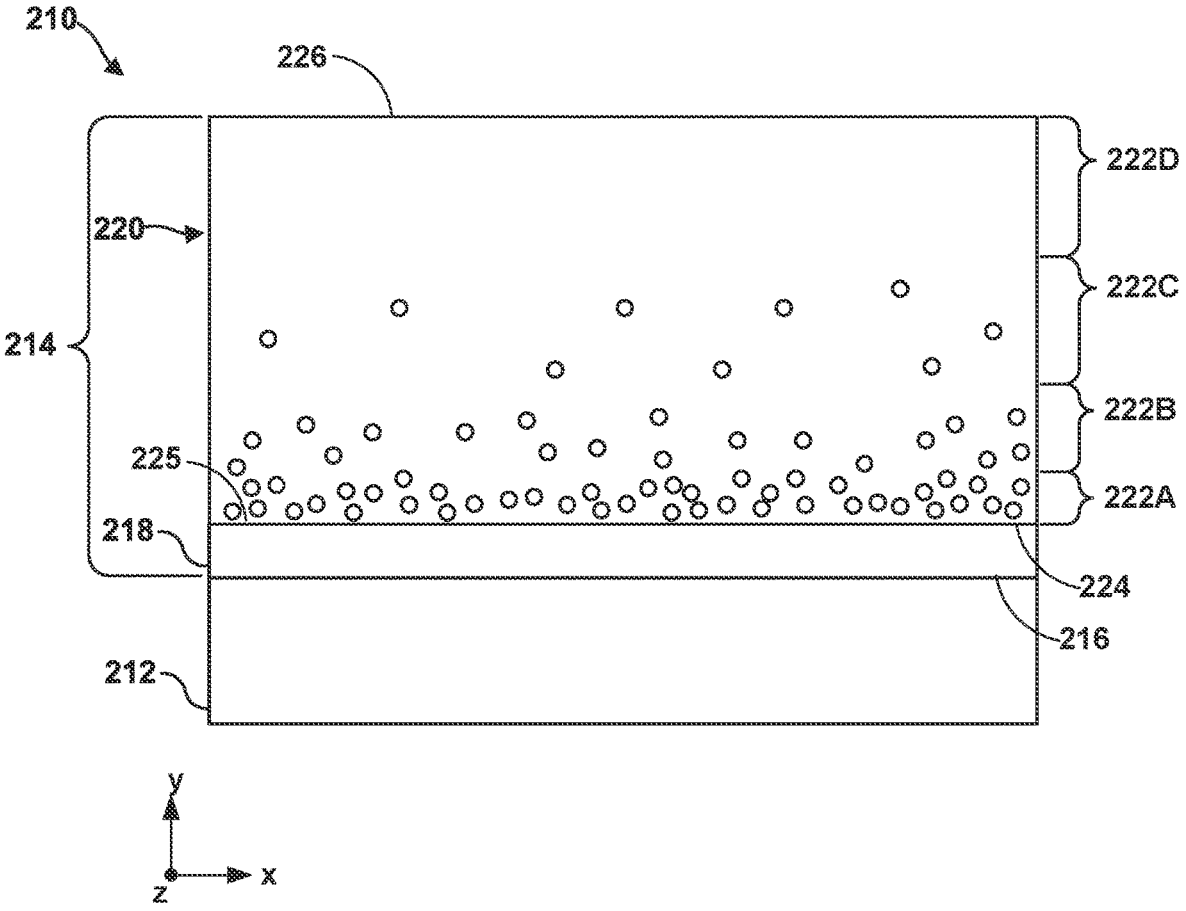
FIG. 3 is a conceptual diagram illustrating a cross-sectional view of an example component that includes a substrate and a coating system that includes a vertically graded coating layer having a dopant.

In some examples, a coating system may include vertically adjacent portions (e.g., adjacent in the y-direction) of a coating layer selected to control a microstructure or chemistry of the coating system to improve a functionality at a selected portion of a component, such as a selected portion of a surface of the component. FIG. 3 is a conceptual diagram illustrating a cross-sectional view of an example component 210 that includes a substrate 212 and a coating system 214 that includes a vertically graded coating layer 120 having a dopant. Component 210 may be the same as or substantially similar to components 10 and/or 110 discussed above in reference to respective FIGS. 1 and 2, expect for the differences described herein.

Component 210 includes bond coat 218 form on surface 216 of substrate 212 and coating 220 formed on surface 224 of bond coat 218. Coating 220 is formed to define a horizontal graded chemistry. For example, coating 220 may define a plurality of layers 222A, 222B, 222C, and 222D (collectively, layers 222). Layers 22 are arranged parallel to surface 216 of substrate 212. Each layer of layers 222 and may include a selected microstructure or chemistry. For example, layers 222 may include any of the coating materials discussed above in reference to FIGS. 1 and 2.

In some examples, each layer of layers 222 may be formed by tape casting. For example, a tape including one or more layers 222 may be prepared, positioned on component 210, and sintered to define a densified coating of coating system 214. Each layer of layers 222 (and/or each segment of the plurality of adjacent segments) may include a selected microstructure or chemistry. The selected microstructures and/or chemistries may be selected to improve a functionality at a selected positions on component 210. In some examples, a tape cast coating may be formed using at least one of slurry casting, tape casting, or gel casting. For example, a slurry used to form a tape may include components or precursors of a tape (e.g., particles, a pre-gellant material, an optional gelation initiator or promoter, optional additives, or other precursors of a tape) in a solvent. Each layer of layers 222 (and/or each segment of the plurality of adjacent segments) may be separately cast or cast with other layers (and/or segments). Multiple cast layers (and/or segments) may be assembled to form the tape cast coating for positioning and sintering on component 210. The tape cast coating may be used, for example, to form coating 220 on component 210 or portions of component 210 that cannot be coated by other techniques (e.g., shadowed regions that cannot be coated by, for example, air plasma spray) Additionally or alternatively, the microstructure of a tape cast coating may be tuned by controlling the chemistry, phase distribution, and/or grain size of the starting powders, controlling the solid loading in the slurry, and/or controlling the sintering conditions. In some examples, as will be described with respect to FIG. 7 below, one or more of bond coat 218 and/or layers 222 may be deposited through a thermal spray process.

In examples in which coating 220 includes a doped EBC, layers 222 may define a graded rare-earth silicate composition. For example, the doped EBC may include a rare-earth monosilicate and a rare-earth disilicate, where coating 220 defines a first surface 225 adjacent to bond coat 218 and a second surface 226 opposing first surface 225. Coating 220 may include a first volume percent of the rare-earth disilicate that is greater than a first volume percent of the rare-earth monosilicate at or near first surface 225, and a second volume percent of the rare-earth monosilicate that is greater than a second volume percent of the rare-earth disilicate at or near second surface 226. For example, the volume percent of the rare-earth disilicate may decrease from layer 222A to layer 222D, whereas the volume percent of the rare-earth monosilicate may decrease from layer 222D to layer 222A.

In some examples, the concentration of the dopant may be graded. For example, coating 220 may include a weight percent of the dopant that is greater at or near first surface 225 (e.g., as illustrated by the spheres), and a second weight percent of the dopant at or near second surface 226. For example, the volume percent of the dopant may decrease from layer 222A to layer 222D. In this way, dopant may be selectively concentrated near an interface of the coating layer where TGO formation is expected (e.g., surface 224).

Figure 4:
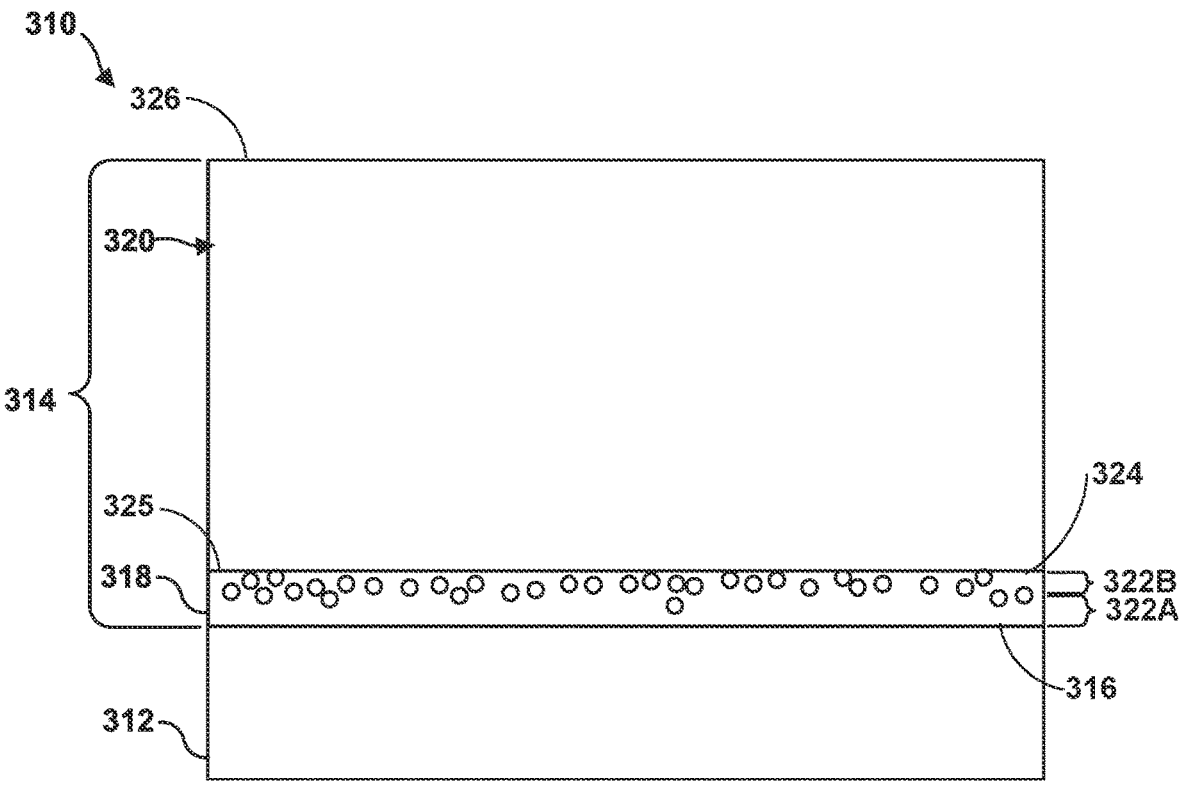
FIG. 4 is a conceptual diagram illustrating a cross-sectional view of an example component that includes a substrate and a coating system that includes a vertically graded coating layer having a dopant.
Figure 4:
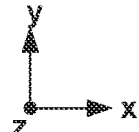

FIG. 4 illustrates an example where bond coat 318 may define a graded chemistry (e.g., graded dopant concentration) as illustrated by the spheres. Although bond coat 318 is illustrated as the doped coating layer as an alternative to coating layer 320 in this example, it should be noted that is some examples both the bond layer and one or more overlying layers of coating 314 may include a dopant. In examples where bond coat 318 defines a graded dopant concentration, bond coat 318 may include a weight percent of dopant that is greater at or near surface 324 within region 322B, and a second volume percent of the dopant at or near second surface 316 within region 322A. For example, the weight percent of the dopant may decrease from surface 224 to surface 216. Additionally or alternatively, a coating system may include horizontally adjacent regions (e.g., adjacent in the x-direction) of a coating layer selected to control a microstructure or chemistry of the coating system to improve a functionality at a selected portion of a component, such as a selected portion of a surface of the component.

In some examples, each layer of layers 322 may be formed by tape casting, as described above. For example, a tape including one or more layers 322 and/or one or may be prepared, positioned on component 310, and sintered to define a densified coating of coating system 314. Additionally or alternatively, as will be described below with respect to FIG. 7, in some examples one or more layers 322 (e.g, all layers 322) may be formed by a thermal spray process.

In examples in which coating layer 320 includes a doped EBC, layers 222 and/or regions 330 may define a graded rare-earth silicate composition. For example, the doped EBC may include a rare-earth monosilicate and a rare-earth disilicate, where coating layer 320 defines a first surface 325 adjacent to bond coat 318 and a second surface 326 opposing first surface 325. Coating layer 320 may include a first volume percent of the rare-earth disilicate that is greater than a first volume percent of the rare-earth monosilicate at or near first surface 325 (e.g., as illustrated by the spheres), and a second volume percent of the rare-earth monosilicate that is greater than a second volume percent of the rare-earth disilicate at or near second surface 326. For example, the volume percent of the rare-earth disilicate may decrease from layer 322A to layer 322D, whereas the volume percent of the rare-earth monosilicate may decrease from layer 322D to layer 322A.

In some examples, as discussed above, coating layer 320 may include at least one EBC layer. Additionally, or alternatively, coating layer 320 may include other types of coatings, such as, for example, an abradable coating.

Figures 5, 6:
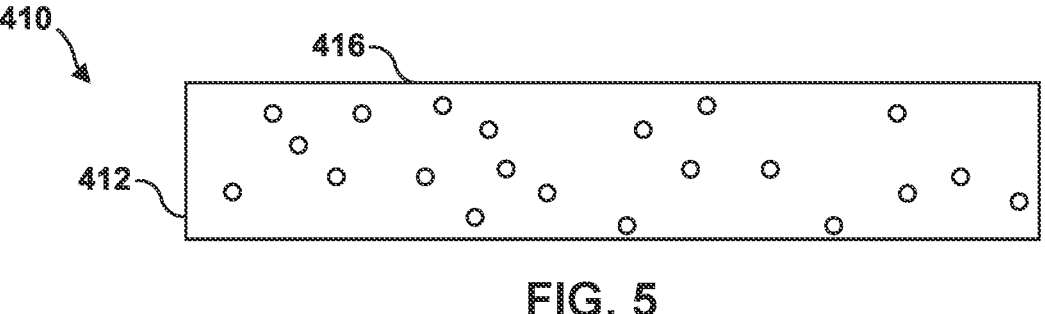
FIG. 5 is a conceptual diagram illustrating a cross-sectional view of an example article that includes a doped substrate according to the present disclosure.
FIG. 6 is a conceptual diagram illustrating a cross-sectional view of an example article that includes a surface layer which includes a dopant.

FIG. 5 is a conceptual diagram illustrating a cross-sectional view of article 410. Article 410 may be an example of article 10 of FIG. 1. As such, article 410 may generally be described as article 10 of FIG. 1, differing as described below. Article 410 includes that includes substrate 412. Substrate 412 defines surface 416. A dopant (illustrated by the spheres) is distributed substantially evenly throughout substrate 412.

Substrate 412 may include a ceramic or a ceramic matrix composite (CMC). In examples in which substrate 12 includes a ceramic, the ceramic may include a matrix material, and the dopant may be included within the matrix material formulation (e.g., mixed with the matrix material. As discussed above, the matrix material may include a ceramic material, such as, for example, SiC, $Si_3N_4$, $Al_2O_3$, aluminosilicates, $SiO_2$, combinations thereof, or the like. Also as discussed above, the dopant may include an oxide, a nitride, or a combination thereof, and the dopant may be configured to inhibit crystallization of a TGO on layer 416 of substrate 412 In examples in which substrate 412 includes a CMC, substrate 412 may include a matrix material and a reinforcement material. The reinforcement material may include discontinuous whiskers, platelets, or particulates; or continuous monofilament or multifilament weave. In some examples, the composition of the reinforcement material is the same as the composition of the matrix material. For example, a matrix material comprising silicon carbide may surround a reinforcement material comprising silicon carbide whiskers. In other examples, the reinforcement material includes a different composition than the composition of the matrix material, such as aluminosilicate fibers in an alumina matrix, or the like. One composition of a substrate 412 that includes a CMC includes a reinforcement material including silicon carbide continuous fibers embedded in a matrix material including silicon carbide. In some examples, substrate 412 may include a SiC—SiC CMC, in which a fibrous preform including SiC fibers is impregnated with SiC particles from a slurry, then melt infiltrated with silicon metal or a silicon alloy to form the melt-infiltrated SiC—SiC CMC.

Advantageously, in some examples, inclusion of the dopant within the substrate (e.g., distributed within the matrix material) may allow for omission of one or more coating layers that would otherwise be necessary. For example, a bond coat layer, an EBC layer, or both may not be included for some applications. Even if the coating layers are included, a dopant included within substrate 412 may improve the life of article 412 in the event that spallation of one or more coating layers on article 412

FIG. 6 is a conceptual diagram illustrating a cross-sectional view of example article 510. Article 510 may be an example of article 10 of FIG. 1. As such, article 510 may generally be described similarly to article 10 of FIG. 1, differing as described below. Article 510 includes substrate 512. Substrate 512 defines surface 516 and surface portion 522. Surface portion 522 defines surface 516 and extends to a depth of substrate 512 that is less than the entire thickness of substrate 512. Surface portion 522 may have the same formulation that the bulk of substrate 512 has, or may have a different formulation. Surface portion 522 includes a dopant (illustrated by the spheres in FIG. 6). In some examples, the dopant may be targeted to surface portion 522 by adding dopant to the CMC matrix material only near surface 516. Advantageously, rather than distributing dopant throughout substrate 512 where it may interfere with other material properties and not migrate into a TGO layer formed on surface 516, targeting the dopant towards surface portion 522 near surface 516 may increase the likelihood that the dopant migrates into a TGO formed at or near surface 516 during operation, and prevents, inhibits, or slows crystallization of the TGO.

Figure 7:
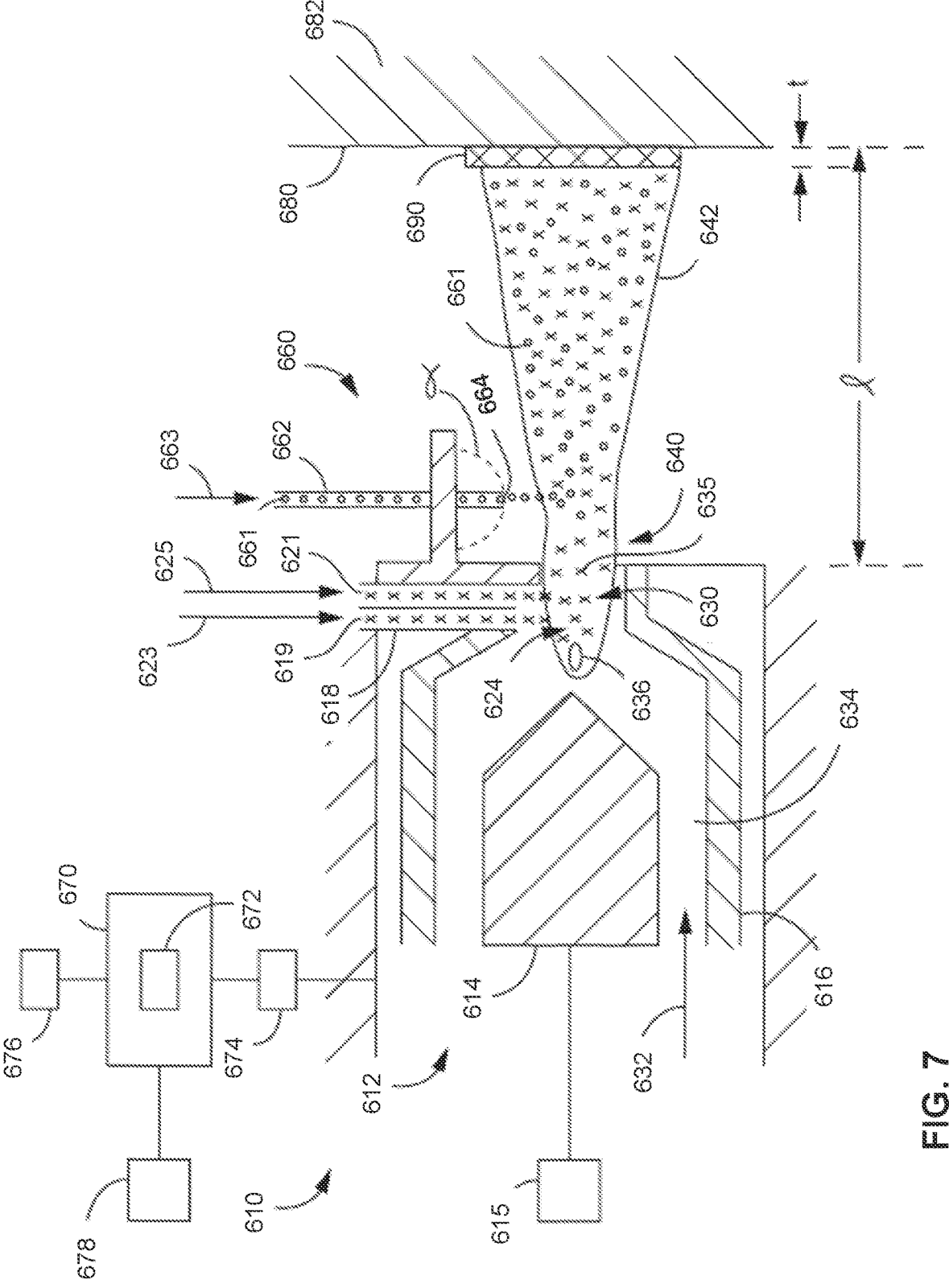
FIG. 7 is a conceptual diagram illustrating a cross-sectional view of an example thermal spray apparatus for use in techniques according to the present disclosure.

The discussion of FIG. 7 primarily considers examples which include a coating system with a dopant. Although other methods for forming coating 14 of FIG. 1, coating 114 of FIG. 2, coating 214 of FIG. 3, and coating 314 of FIG. 4, are considered, including tape casting methods, thermal spray processes may be employed to form such coatings. Referring now to FIG. 7, an example of a thermal spray apparatus 610, which is not intended to be limiting, includes plasma torch or spray gun 612. Plasma spray gun 612 includes a cathode 614 and an anode 616, and is powered by a power supply 615. In plasma spray gun 612 of FIG. 7, cathode 614 is cone-shaped, while anode 616 is substantially cylindrical, but cathode 614 and anode 616 may have any suitable shape. Both anode 614 and cathode 616 may be made of any suitable metal or metal alloy such as, for example, those including tungsten, copper, iron, aluminum, and the like.

One or more plasma gases 632 for forming a plasma and accelerating a ceramic feedstock toward a target surface of a substrate flow may be fed into thermal spraying apparatus 610 through annular passages 634 in plasma spray gun 612, and plasma arc 636 may be formed between electrodes 614, 616. Suitable plasma gases 632 include, but are not limited to, combustible gases such as oxygen and hydrogen, as well as relatively inert gases such as argon, nitrogen, helium, water vapor, and mixtures and combinations thereof.

As shown schematically in FIG. 7, one or more injection ports 618, 620 may be used to feed at least one ceramic feedstock 619, 621 into plasma spray gun 612. In some examples, ceramic feedstock(s) 619, 621 may be transported into the plasma spray apparatus by carrier gas 623, 625. Carrier gas 623, 625 used to feed the ceramic feedstock include but not limited to inert gases such as argon, nitrogen, helium, and mixtures and combinations thereof. Ceramic feedstocks 619, 621 may enter heating zone 630 between electrodes 614, 616 and adjacent to plasma arc 636 to form a heated ceramic feedstock 624 in heating zone 630. In various examples, the one or more ceramic feedstocks 619, 621 may be fed into plasma spray apparatus 610 in the form of a powder, a rod, a wire, a slurry, a liquid, or combinations thereof. In some examples, the composition of ceramic feedstocks 619, 621 can be selected to combine in the heating zone 630 to produce coating 690, which may be an example of all or a portion of coating 14 of FIG. 1, on target surface 680 of substrate 682 with a selected composition, a selected layer structure, and the like. Surface 680 of substrate 682 of FIG. 7 may be an example of surface 16 of substrate 12 of FIG. 1. In some cases, other parameters of plasma spray apparatus 610 and plasma spray gun 612 may be adjusted to produce a selected composition for the coating 690 such as, for example, the flow rate of plasma gas 632, the current between electrodes 614, 616, a path length/from nozzle 640 to target surface 680, and the like. In some examples, a ceramic feedstock which forms the matrix of coating 690 may be fed through injection port 618 and the dopant including an oxide or nitride may be separately fed through injection port 620. Alternatively, the dopant may be included with the matrix material of the coating as ceramic feedstock fed through one or both injection ports 618, 620, such that the dopant is supplied with the coating formulation and fed blended with ceramic feedstock 619, ceramic feedstock 621, or both.

Heated ceramic feedstock 624 may be entrained in the stream of carrier gas 632 that flows into heating zone 630 so that plasma arc 636 loops out of nozzle 640 of plasma gun 612 and forms a heated gas stream also referred to herein as plasma flame 642. In some examples, the temperatures in plasma flame 642 can be about 10,000° C. to about 15,000° C., which in various examples can melt all or a portion of the heated ceramic feedstock 624.

The at least partially melted or softened ceramic particles 635 arrive on surface 680 after having been sufficiently heated and accelerated by plasma flame 642. The velocity and temperature of ceramic particles or droplets 635 are directly related to, for example, the plasma gas type, parameters of plasma gun 612, distance between plasma gun 612 and surface 680. When softened ceramic materials, which in some cases are in the form of droplets, impact surface 680, they may be flattened and spread out on the surface 680 and form a coating through successive impingement. In some examples, ceramic particles 635 may deposited to form a substantially continuous coating 690, and in other examples ceramic particles 635 may be deposited in discontinuous regions referred to as "splats" to form the coating 690.

In some examples, thermal spray apparatus 610 and plasma spray gun 612 may further include a feed system 660 for feeding a dopant composition 661 into plasma flame 642. The feed system 660 may include injection port 662, and in various examples the dopant composition 661 can be fed into plasma flame 642 via an angularly adjustable nozzle 664 by gravity, by extrusion, with a plunger, or by entraining particles of the dopant composition in a carrier gas 663, which may be the same or different from plasma gas 632 used to entrain the ceramic particles and form the plasma flame, and carrier gases 623, 625 utilized to transport the ceramic particles 619, 621. In various examples, dopant composition 661 may fed into plasma flame 642 in the form of particles, droplets, a liquid, as a slurry, or combinations thereof.

The flow rate of carrier gas 663, the feed rate of dopant composition 661, or both, can be adjusted to selectively tailor the ratio of dopant composition 661 to ceramic particles 635 which form the coating matrix 690. In this way, the concentration of dopant may be altered throughout layers or portions of layers of coating 690, as illustrated and discussed above.

In some examples, the angle α of nozzle 664 may also be adjusted through a range of 0° to 90°, or −30° (backward) to +30° (forward), or −15° (backward) to +15° (forward), with respect to a plane of target surface 480, to introduce dopant composition 661 into the plasma flame 642 in a wide variety of different ways. For example, the injection angle may be modified based on the relative feed rates of ceramic feedstocks 619, 620, dopant composition 661, carrier gases 623, 625, 663, or the like to ensure good mixing of the components of coating 690.

In various examples shown schematically in FIG. 7, thermal spray apparatus 610 may include controller 670 with at least one processor 672. Controller 670 may be configured to control one or more parameters of plasma spray apparatus 610 to determine one or more physical or chemical properties of plasma flame 642 and coating 690 produced therefrom. In some examples, which are not intended to be limiting, controller 670 may be configured to control power supply 615 of plasma spray gun 610 to adjust one or more of the arc created by electrodes 612, 614, the feed rates of ceramic feedstocks 618, 620, the feed rate of dopant composition 661, or the like.

In some examples, controller 670 may be configured to process detected signals from one or more sensor systems 676 in or on thermal spray apparatus 610. Processor 672 may be integrated with sensor systems 676, may be integrated with controller 670, or may be a remote processor functionally connected to controller 670.

Processor 672 may be any suitable software, firmware, hardware, or combination thereof. Processor 672 may include any one or more microprocessors, controllers, digital signal processors (DSPs), application specific integrated circuits (ASICs), field-programmable gate arrays (FPGAs), or discrete logic circuitry. The functions attributed to processor 672 may be provided by processing circuitry of a hardware device, e.g., as supported by software and/or firmware.

In some examples, processor 672 may be coupled to memory device 676, which may be part of controller 670 or remote thereto. Memory device 676 may include any volatile or non-volatile media, such as a random-access memory (RAM), read only memory (ROM), non-volatile RAM (NVRAM), electrically erasable programmable ROM (EEPROM), flash memory, and the like. Memory device 676 may be a storage device or other non-transitory medium. Memory device 676 may be used by processor 672 to, for example, store fiducial information or initialization information corresponding to, for example, measurements or stored signals from sensor system 674 of parameters of thermal spray apparatus 610, plasma flame 642, and coating 690. In some examples, which are not intended to be limiting, memory device 676 may store information regarding one or more of the arc created by electrodes 612, 614, the flow rate of plasma gas 632, the flow rates of carrier gases 623, 625, 663, the feed rates of ceramic feedstocks 619, 621, the feed rate of dopant composition 661, feed angle α of nozzle 664, and the like, for later retrieval. In some examples, memory device 676 may store determined values, such as information corresponding to detected layer thickness measurements and layer thickness compositions for coating 690, for later retrieval.

In some embodiments, controller 670 and processor 672 may be coupled to user interface 678, which may include a display, user input, and output (not shown in FIG. 7). Suitable display devices include, for example, monitor, PDA, mobile phone, tablet computers, and the like. In some examples, user input may include components for interaction with a user, such as a keypad and a display such as a cathode ray tube (CRT) display, a liquid crystal display (LCD) or light emitting diode (LED) display, and the keypad may take the form of an alphanumeric keypad, or a reduced set of keys associated with particular functions. In some examples, the displays may include a touch screen display, and a user may interact with user input via the touch screens of the displays. In some examples, the user may also interact with the user input remotely via a networked computing device.

Controller 670 can be configured to control any selected number of functions of thermal spray apparatus 610 including, but not limited to, one or more of the arc created by electrodes 612, 614, the feed rate of plasma gas 632, carrier gases 623, 625, 663, the feed rates of ceramic feedstocks 619, 621, the feed rate of dopant composition 661, and feed angle α of nozzle 664 in response to signals from processor 672 input manually into controller 670, or stored in memory device 676.

In some examples, controller 670 can be configured to generate control signals, based in part on layer thickness information or layer composition information regarding coating 690 and obtained from, for example, one or more sensors in sensor system 674, to provide closed loop control of the layer composition of coating 690 produced by plasma flame 642.

In various examples, controller 670 may be adjusted by a variety of manual and automatic means. Automatic means may make use of any number of control algorithms or other strategies to achieve desired conformance to a control parameter or desired layer thickness function for coating 690. For example, standard control schemes as well as adaptive algorithms such as so-called "machine-learning" algorithms may be used. In some examples, controller 670 can utilize information from other sources such as, for example, infrared cameras, to determine the control action decided by algorithms such as PID control schemes or machine learning schemes.

Figure 8:
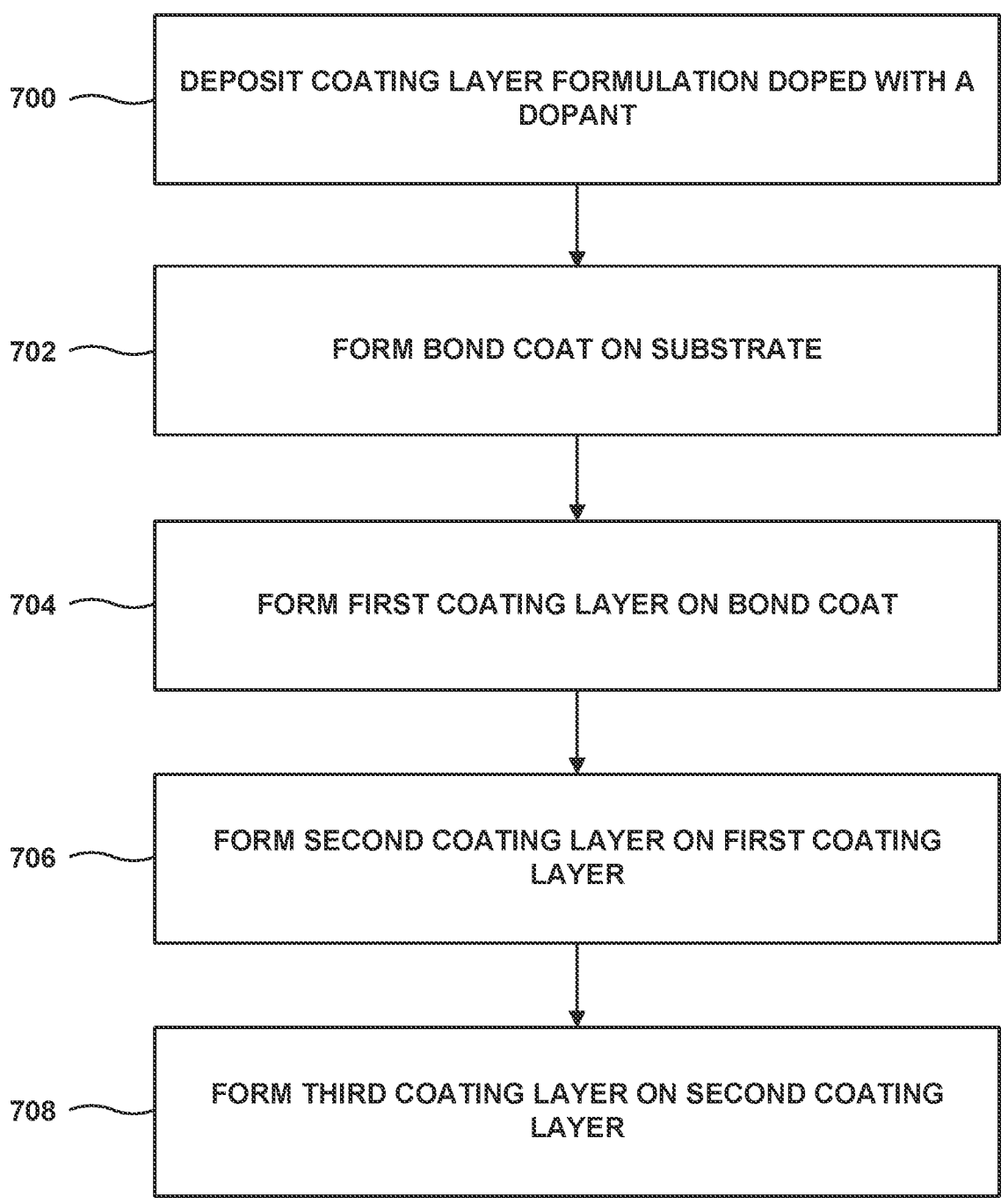
FIG. 8 is a flow diagram illustrating an example technique for forming an article that includes a substrate and a coating system that includes a coating layer having a dopant.

Coating systems including a coating layer including a dopant which includes an oxide or nitride described herein may be formed using any suitable manufacturing technique. FIG. 8 is a flow diagram illustrating an example technique for forming an example coating system including a doped coating layer. The technique illustrated in FIG. 8 will be described with respect to article 110 of FIG. 2. However, the technique illustrated in FIG. 8 may be used to form other articles, and article 110 may be formed using other techniques.

The technique includes depositing a coating layer formulation doped with a dopant configured to inhibit crystallization of a thermally grown oxide layer including amorphous silicon dioxide on the surface at an operating temperature of an article (700). In some examples, the dopant may include an oxide or a nitride, and the technique may further include adding the dopant to a coating layer formulation in a range of from about 0.1 wt. % to about 15 wt. %, or from about 0.5 wt. % to about 10 wt. %, or from about 1 wt. % to about 5 wt. %. In some examples, the dopant may be added as a solid solution constituent within a silicate glass into the raw materials (e.g., the coating layer formulation) of the EBC and/or bond coat, in any of a powder, a slurry, an ingot, a tape, mixtures or combinations thereof, or the like.

In some examples, the technique optionally includes forming bond coat 118 on substrate 112 (702). Bond coat 118 may be formed on surface 116 of substrate 112 using a thermal spray technique (e.g., atmospheric plasma spray (APS), high velocity oxygen fuel (HVOF) thermal spray, suspension plasma spray (SPS), detonation gun (D-Gun) thermal spray, or the like), slurry spray or paste, tape casting, electrophoretic deposition, physical vapor deposition (PVD), chemical vapor deposition (CVD), plasma spray physical vapor deposition (PS-PVD), electron-beam physical vapor deposition (EB-PVD), or the like. In some examples, article 110 may not include bond coat 118, and the technique may not include forming bond coat 118 on substrate 112 (702).

The technique includes forming coating layer 120 having a dopant on bond coat 118 (or substrate 112 if the coating layer having a dopant is bond coat 118, or if bond coat 118 is not present) (704). Coating layer 120 may be formed using, for example, a thermal spray technique (e.g., atmospheric plasma spray (APS), high velocity oxygen fuel (HVOF) thermal spray, suspension plasma spray (SPS), detonation gun (D-Gun) thermal spray, or the like), slurry spray or paste, tape casting, electrophoretic deposition, physical vapor deposition (PVD), chemical vapor deposition (CVD), plasma spray physical vapor deposition (PS-PVD), electron-beam physical vapor deposition (EB-PVD), or the like. In examples in which coating layer 120 includes a graded chemistry, forming coating layer 120 may include controlling an amount of at least one coating material applied by, for example, thermal spraying. For example, an amount of dopant or silicate may be controlled during thermal spraying to produce a graded chemistry. Additionally or alternatively, a graded chemistry may be formed by tape casting.

In examples in which forming coating layer includes tape casting, the technique may include forming a tape defining at least coating layer and/or segment (e.g., layers 322, illustrated in FIG. 4). For example, forming the tape may include applying, by a tape casting system, a first slurry containing the first coating material to a carrier film and applying, by the tape casting system, a second slurry containing the second coating to the carrier film adjacent to the first slurry. In some examples, forming the tape may include assembling the tape to position horizontally or vertically adjacent layers relative to one another. In some examples, forming the tape may include at least partially sintering the tape and/or infiltrating cracks to reduce a porosity of the tape. After forming the tape, the technique may include positioning the tape on a surface of a substrate 112 or bond coat 118, such as, for example, to define horizontally adjacent regions or vertically adjacent layers or on a portion of substrate 120 that would be shadowed in a thermal spray process. After positioning the tape, the technique may include heating the tape to sinter a constituent of at least one of the tape to form a densified coating, such as, to a temperature between about 1200° C. and about 1600° C., such as between about 1327° C. and about 1427° C.

The technique optionally includes forming second coating layer 128 on first coating layer 120 (706). Second coating layer 128 may be formed using, for example a thermal spray technique (e.g., atmospheric plasma spray (APS), high velocity oxygen fuel (HVOF) thermal spray, suspension plasma spray (SPS), detonation gun (D-Gun) thermal spray, or the like), slurry spray or paste, tape casting, electrophoretic deposition, physical vapor deposition (PVD), chemical vapor deposition (CVD), plasma spray physical vapor deposition (PS-PVD), electron-beam physical vapor deposition (EB-PVD), or the like.

The technique optionally includes forming third coating layer 130 on second coating layer 128 (708). Third coating layer 130 may be formed using, for example, a thermal spray technique (e.g., atmospheric plasma spray (APS), high velocity oxygen fuel (HVOF) thermal spray, suspension plasma spray (SPS), detonation gun (D-Gun) thermal spray, or the like), slurry spray or paste, tape casting, electrophoretic deposition, physical vapor deposition (PVD), chemical vapor deposition (CVD), plasma spray physical vapor deposition (PS-PVD), electron-beam physical vapor deposition (EB-PVD), or the like.

Various examples have been described. These and other examples are within the scope of the following clauses and claims.

Clause 1. An article comprising: a substrate defining a surface; and a coating layer overlying the substrate, wherein the coating layer comprises a dopant configured to inhibit crystallization of a thermally grown oxide layer comprising amorphous silicon dioxide at an interface of the coating layer at an operating temperature of the article, wherein the dopant comprises at least one of an oxide or a nitride.

Clause 2. The article of clause 1, wherein the dopant comprises less than about 10 weight percent of the coating layer.

Clause 3. The article of clause 1 or clause 2, wherein the coating layer is a bond coat layer.

Clause 4. The article of any of clauses 1-3, wherein the coating layer comprises an environmental barrier coating (EBC) further comprising at least one rare-earth monosilicate or rare-earth disilicate.

Clause 5. The article of any of clauses 1-4, further comprising a bond coat on the surface of the substrate and between the coating layer and the surface of the substrate.

Clause 6. The article of any of clauses 1-5, wherein the dopant comprises one or more of silicon nitride or aluminum nitride.

Clause 7. The article of any of clauses 1-6, wherein the coating layer is a bond coat layer comprising at least two regions, wherein the first region is closer to the substrate than the second region, and wherein the second region of the bond coat includes a greater amount of the dopant than the second region.

Clause 8. The article of any of clauses 1-7, further comprising an abradable coating on the coating layer, wherein the abradable coating comprises at least one rare-earth monosilicate or rare-earth disilicate.

Clause 9. The article of any of clauses 1-8, wherein the coating layer comprises graded chemistry, a graded porosity, or a graded chemistry and a graded porosity.

Clause 10. The article of any of clauses 1-9, wherein the article is a high temperature component of a gas turbine engine.

Clause 11. A gas turbine engine component comprising: a ceramic matrix composite (CMC) substrate defining at least a portion of the gas turbine engine component, wherein the CMC substrate comprises a silicon-containing material; and a coating layer overlying the CMC substrate, wherein the coating layer comprises a dopant configured to inhibit crystallization of a thermally grown oxide layer comprising amorphous silicon dioxide at an interface of the coating layer at an operating temperature of the gas turbine engine component, wherein the dopant comprises at least one of an oxide or a nitride.

Clause 12. The gas turbine engine component of clause 11, wherein the dopant comprises less than about 10 weight percent of the coating layer.

Clause 13. A method comprising: depositing a coating layer formulation on a substrate defining a surface to form a coating layer, wherein the coating layer comprises a dopant configured to inhibit crystallization of a thermally grown oxide layer comprising amorphous silicon dioxide at an interface of the coating layer at an operating temperature of an article; wherein the dopant comprises an oxide or a nitride.

Clause 14. The method of clause 13, wherein depositing the coating layer comprises thermal spraying.

Clause 15. The method of clause 14, wherein thermal spraying comprises feeding a ceramic feedstock into a heating zone of a thermal spray apparatus, wherein the ceramic feedstock includes the dopant.

Clause 16. The method of clause 14, wherein thermal spraying comprises: feeding a ceramic feedstock into a heating zone of a thermal spray apparatus, and feeding a dopant composition with a dopant feed apparatus into a heated gas stream of the thermal spray apparatus downstream of the heating zone.

Clause 17. The method of clause 16, wherein the ceramic feedstock comprises at least one rare earth silicate.

Clause 18. The method of clause 16 or clause 17, wherein the ceramic feedstock comprises a first ceramic feedstock comprising a rare earth (RE) monosilicate and a second ceramic feedstock comprising a RE disilicate.

Clause 19. The method of any of clauses 16-18, wherein the dopant composition is fed into the heated gas stream in the form of a powder entrained in a carrier gas.

Clause 20. The method of any of clauses 16-19, wherein feeding the dopant composition comprises varying a feed rate of dopant relative to the feed rate of ceramic feedstock

What is claimed is:

1. An article comprising:
a substrate defining a surface; and
a coating layer overlying the substrate, wherein the coating layer comprises a dopant configured to inhibit crystallization of a thermally grown oxide layer comprising amorphous silicon dioxide at an interface of the coating layer at an operating temperature of the article, wherein the dopant comprises both lanthanum oxide and silicon nitride, and wherein the dopant is included in the coating layer in a range of from about 1 weight percent to about 5 weight percent.

2. The article of claim 1, wherein the coating layer is a bond coat layer.

3. The article of claim 1, wherein the coating layer comprises an environmental barrier coating (EBC) further comprising at least one rare-earth monosilicate or rare-earth disilicate.

4. The article of claim 1, further comprising a bond coat on the surface of the substrate and between the coating layer and the surface of the substrate.

5. The article of claim 1, wherein the dopant further comprises aluminum nitride.

6. The article of claim 1, wherein the coating layer is a bond coat layer comprising at least two regions, wherein the first region is closer to the substrate than the second region, and wherein the second region of the bond coat includes a greater amount of the dopant than the first region.

7. The article of claim 1, further comprising an abradable coating on the coating layer, wherein the abradable coating comprises at least one rare-earth monosilicate or rare-earth disilicate.

8. The article of claim 1, wherein the coating layer comprises graded chemistry, a graded porosity, or a graded chemistry and a graded porosity.

9. The article of claim 1, wherein the article is a high temperature component of a gas turbine engine.

10. The article of claim 1, wherein the dopant increases a glass transition temperature of the thermally grown oxide layer.

11. A gas turbine engine component comprising:

a ceramic matrix composite (CMC) substrate defining at least a portion of the gas turbine engine component, wherein the CMC substrate comprises a silicon-containing material; and a coating layer overlying the CMC substrate, wherein the coating layer comprises a dopant configured to inhibit crystallization of a thermally grown oxide layer comprising amorphous silicon dioxide at an interface of the coating layer at an operating temperature of the gas turbine engine component, wherein the dopant comprises both lanthanum oxide and silicon nitride, and wherein the dopant is included in the coating layer in a range of from about 1 weight percent to about 5 weight percent.

12. A method comprising:

depositing a coating layer formulation on a substrate defining a surface to form a coating layer, wherein the coating layer comprises a dopant configured to inhibit crystallization of a thermally grown oxide layer comprising amorphous silicon dioxide at an interface of the coating layer at an operating temperature of an article;

wherein the dopant comprises both lanthanum oxide and silicon nitride, and wherein the dopant is included in the coating layer in a range of from about 1 weight percent to about 5 weight percent.

13. The method of claim 12, wherein depositing the coating layer comprises thermal spraying.

14. The method of claim 13, wherein thermal spraying comprises feeding a ceramic feedstock into a heating zone of a thermal spray apparatus, wherein the ceramic feedstock includes the dopant.

15. The method of claim 13, wherein thermal spraying comprises:

feeding a ceramic feedstock into a heating zone of a thermal spray apparatus, and feeding a dopant composition with a dopant feed apparatus into a heated gas stream of the thermal spray apparatus downstream of the heating zone.

16. The method of claim 15, wherein the ceramic feedstock comprises at least one rare earth silicate.

17. The method of claim 15, wherein the ceramic feedstock comprises a first ceramic feedstock comprising a rare earth (RE) monosilicate and a second ceramic feedstock comprising a RE disilicate.

18. The method of claim 15, wherein the dopant composition is fed into the heated gas stream in the form of a powder entrained in a carrier gas.

19. The method of claim 15, wherein feeding the dopant composition comprises varying a feed rate of dopant relative to the feed rate of ceramic feedstock.

* * * * *